July 21, 1925.
H. B. McKAHIN
DISK HARROW
Original Filed Oct. 16, 1922    2 Sheets-Sheet 2
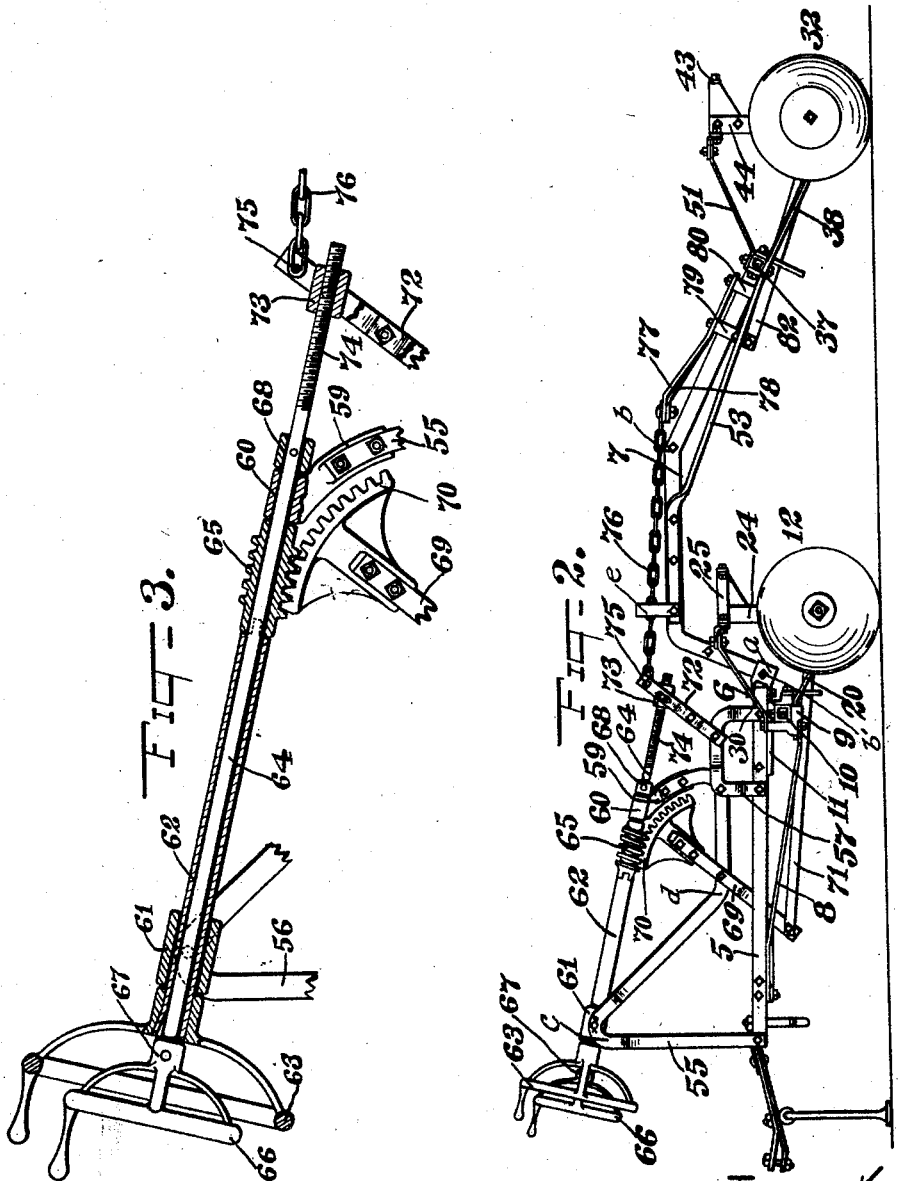
Witness;
E. Wilderson
Inventor;
Herbert B. McKahin
T. W. C. Johnston
Attorney Patented July 21, 1925.

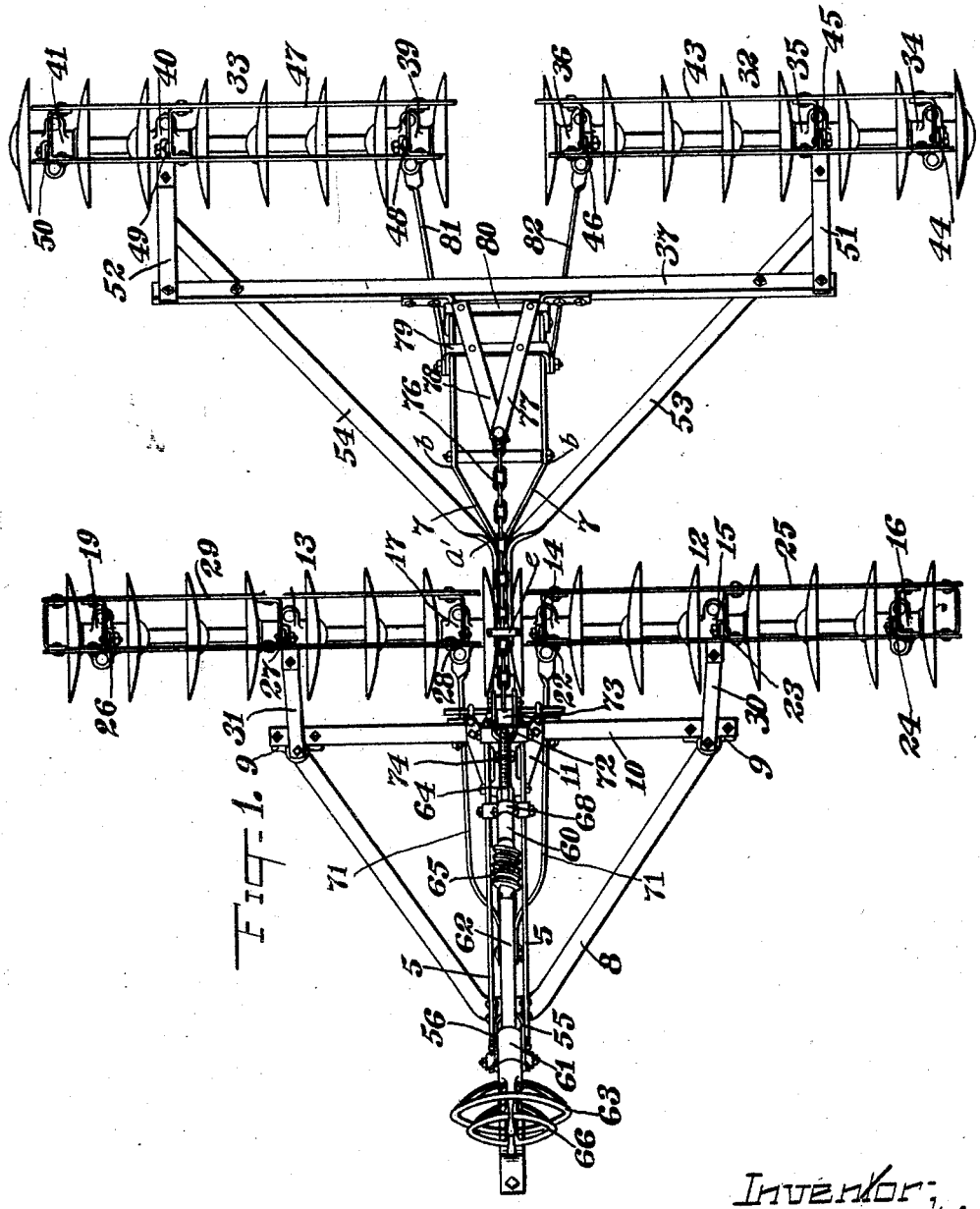

1,546,547

UNITED STATES PATENT OFFICE.

HERBERT B. McKAHIN, OF MOLINE, ILLINOIS, ASSIGNOR TO DEERE & COMPANY, OF MOLINE, ILLINOIS, A CORPORATION OF ILLINOIS.

DISK HARROW.

Application filed October 16, 1922, Serial No. 594,840. Renewed March 21, 1925.

*To all whom it may concern:*

Be it known that I, HERBERT B. McKAHIN, a citizen of the United States, residing at Moline, in the county of Rock Island and State of Illinois, have invented certain new and useful Improvements in Disk Harrows, of which the following is a specification, reference being had therein to the accompanying drawing.

My invention relates to disk harrows, and particularly to that type of disk harrow which works the soil twice at each traverse of the field. Such implements are commonly known as "double action" or "tandem disk harrows", and comprise two harrow units each consisting of a draft frame and two disk gangs, one unit being arranged behind the other with the rear frame pivotally coupled to the front frame in such manner that the gangs of the rear unit may swing laterally relatively to the gangs of the front unit. The several gangs are mounted to turn on vertical pivots so that by moving their ends fore and aft the angle of the disks to the line of advance may be adjusted. Usually the disks of the front gangs are arranged to throw the soil outwardly, while those of the rear gangs are arranged to throw the soil inwardly, thus leaving it in a level condition after the passage of the implement thereover. As the extent to which the disks penetrate the soil is governed largely by the angle at which they are set with respect to the line of advance, and as changes in the character and condition of the soil require adjustment of the cutting angle of the disks to obtain the proper execution, it is desirable that means be provided whereby the operator can at all times readily control the angle of the disks of either the front or the rear sets of gangs by fore and aft adjustment of the ends of the gangs, and particularly that the controlling means be operable from the front of the harrow as a whole, as such harrows are usually drawn by a tractor, and it is important that the controlling means be so located as to be readily accessible from the deck or platform of the tractor.

The object of my invention is to provide improved controlling means by which the gangs of either set may easily be angularly adjusted from the front of the harrow, either simultaneously with, or separately from the gangs of the other set; also to provide for holding the disk gangs in their different positions of adjustment by such controlling means.

Referring to the drawings in which similar numerals indicate identical parts.

Figure 1 is a plan view of a double or tandem disk harrow embodying my invention. Figure 2 is a side elevation of Figure 1, and Figure 3 is a detail, in part section, of part of the control mechanism.

In the embodiment of my invention illustrated, the main draft member of the frame of the front harrow unit is composed of parallel bars 5 spaced apart and provided at their forward ends with a draft device of any suitable type. The main draft member of the frame of the rear harrow unit is composed of bars 7, the front end portions of which are arranged in parallelism and secured closely together to form an attaching member by which the rear frame is connected with a coupling or hinge $a$, which is connected to the rear ends of the bars 5 by a vertical pivot 6 so that the rear frame may swing transversely relatively to the front frame, as hereinafter described. The bars 7 are connected with the coupling $a$ by a transversely disposed horizontal pivot $b'$, so that the rear harrow unit may swing vertically relatively to the front harrow unit when the implement is used on rough ground. As best shown in Fig. 2, the front portions of the bars 7 extend upwardly and rearwardly from the coupling $a$, and then for a space, as to the point $b$, are disposed horizontally and diverge rearwardly; from the point $b$ they incline downwardly in parallel relation to each other, and their rear ends are bent outwardly and are firmly secured to a transverse bar, hereinafter described, that forms part of the frame of the rear harrow unit.

As best shown in Fig. 1, the front draft frame also comprises an arched bar 8, the forward portion of which is disposed transversely of and is secured to the bar 5, while its diverging rear ends are secured respectively to brackets 9 mounted on the ends of a transverse bar 10 rigidly mounted on a bracket 11 bolted to the rear portion of the bars 5.

The front harrow unit comprises disk gangs 12 and 13 of the usual type each consisting of a suitable shaft on which are mounted a series of concavo-convex disks spaced apart, as shown in Fig. 1. The gang 12 is provided with bearings 14, 15 and 16, and similar bearings 17, 18 and 19 are on the gang 13. The gang 12 is connected to the front draft frame by a link 20 which is pivotally secured to the bearings 15 and to the adjacent bracket 9, the gang 13 having a similar connection to the front draft frame consisting of a link 21 pivotally connected to the bearing 18 and to the adjacent bracket 9 on the draft frame. Vertical arms 22, 23, and 24 are mounted on the bearings 14, 15 and 16 respectively of the gang 12 to support a frame 25 which may be utilized as a support for weight boxes or scraper bars. Similar vertical arms 26, 27 and 28 are secured to the bearings 17, 18 and 19 of the gang 13 and support a similar frame 29. Braces 30 and 31 are pivotally attached to the bearings 15 and 18 respectively and to the brackets 9 on the front draft frame.

The rear harrow unit comprises gangs 32 and 33, the gang 32 having bearings 34, 35 and 36, and being attached to one end of a transverse rigid bar 37 by a bar 38 which is secured to the bearing 35 and to the transverse bar 37. The latter bar forms part of the rear draft frame, and to it the rear ends of the bars 7 are secured as above stated. The gang 33 is provided with bearings 39, 40 and 41, and it is secured to the other end of the transverse bar 37 by a bar, not shown, similar to the bar 38 and bolted to the transverse bar 37. A frame 43 is supported on vertical arms 44, 45 and 46 secured to the bearings 34, 35 and 36 on the gang 32, and a similar frame 47 is supported on vertical arms 48, 49 and 50 mounted on the bearings 39, 40 and 41; from the frame 43 a bar 51 extends to connection with the transverse bar 37, and a bar 52 extends from the frame 47 to the transverse bar 37 to which it is bolted. The frames 43 and 47 are employed for the same purpose as the frames 25 and 29.

The bars 7, from their pivotal connection with the front draft frame, extend upwardly to a plane above the frames 25 and 29 on the gangs 12 and 13 and then horizontally rearward to the point $b$ as has been explained. To the horizontal part of said bars are bolted bars 53 and 54 which extend downwardly, rearwardly and divergingly to the transverse bar 37 to the end portions of which they are rigidly secured. The bars 7 and the bars connected therewith and to the gangs 32 and 33 form the draft frame of the rear harrow.

Secured to the forward ends of the front draft frame bars 5, and disposed vertically, are bars 55 and 56 which are bent rearwardly at $c$ and extended downwardly and rearwardly to $d$ from which point they extend rearwardly to an inverted U-shaped bracket formed of bars 57 and 58 bolted respectively to the bars 5. The rear portions of the bars 55 and 56 are rigidly secured between the bars 57 and 58 and extend above them in a forward curve and support between them a casting 59 to which they are bolted. On the upper end of the casting 59 is a bearing 60 in alinement with a bearing 61 secured between the bars 55 and 56 at the point $c$.

Rotatably journaled in the bearing 61 is a tubular shaft 62 having a bowl shaped hand wheel 63 secured to its forward end. A shaft 64 is rotatably journaled in said tubular shaft and in the bearings 60 on the casting 59; on the shaft 64, between the bearing 60 and the rearward end of the tubular shaft 62, is rotatably mounted a worm 65 which is connected to the tubular shaft 62 in any suitable manner so that it may be rotated therewith by operation of the wheel 63. A hand wheel 66 is secured on the forward end of the shaft 64 and its hub 67 contacts with the forward end of the tubular shaft 62, this contact cooperating with a collar 68, bolted to the shaft 64 rearward of the bearing 60, to prevent longitudinal movement of said shafts.

Pivotally mounted intermediate its length on the bars 55 and 56, rearward of the point $d$, is a lever 69 having secured on its upper end a sector gear 70 in mesh with the worm 65. Pivotally connected to the lower end of the lever 69 and on opposite sides thereof are links 71, pivotally attached respectively to the bearings 14 and 28 on the gangs of the front harrow unit. A lever 72, formed preferably of two bars bolted together is pivotally supported on the U-shaped bracket, and between the upper portion of the bars thereof is pivotally secured a sleeve 73 which is interiorly threaded to receive the threaded end 74 of the shaft 64. A bolt 75 is secured transversely of the upper end of the lever, and attached thereto is a chain 76 which extends rearwardly through a loop guide $e$ on the rear harrow frame to a frame slidably supported on the bars 7, consisting of bars 77 and 78 and transverse bars 79 and 80 rigidly secured together. The transverse bars 79 and 80 are bent downwardly outside the bars 7, and to the ends of the bar 79 are respectively connected links 81 and 82 which are pivotally attached to the bearings 36 and 39 on the gangs 32 and 33.

It is clearly apparent that by operation of the hand wheel 63 the tubular shaft 62 and the worm 65 attached thereto may be rotated thereby, actuating the sector gear 70 and rocking the lever 69 so that, through the links 71, the gangs 12 and 13 of the front harrow unit may be angled to the desired degree; and it is equally obvious that by operation of the hand wheel 66 the shaft 64 may be rotated thereby rocking the lever 72 so that the rear gangs will be angled through their connection to the sliding frame on the bars 7, the movement of the sliding frame being accomplished by the pull of the chain 76 attached to the lever 72 and to the sliding frame.

It will be seen, therefore, that I have provided an improved tandem disk harrow, the front unit of which comprises a front frame having gangs of disks connected thereto so that their ends are adjustably movable fore and aft, with gang adjusting devices carried by said front frame that are adapted to be operated to adjust said gangs, and the rear unit of which comprises a rear frame that is pivotally coupled with the front frame so that it may swing laterally relatively thereto, and has connected therewith gangs of disks the ends of which are also adjustably movable fore and aft, together with gang adjusting devices that are adapted to be operated to adjust the rear gangs, associated with which front and rear units are unitarily mounted independently operable means for operating said gang adjusting devices. By making the means for operating the gang adjusting devices in the form of the tubular shaft 62 and the shaft 64, and extending the latter shaft through said tubular shaft, so that said two shafts are coaxial, they are disposed so that either shaft may readily be operated separately, or both may be operated at the same time; moreover, the tubular shaft provides a very effective support on the front frame for the shaft 64, and the arrangement possesses the advantages of being strong and compact. As will be appreciated, the two levers 69, 72 constitute screw-actuated devices, both of which are mounted on the front frame, by the operation of which the front and rear sets of gangs may be adjusted, and the said screw-actuated devices cooperate respectively with threaded power transmitting devices in the form of the worm 65 and the threaded portion 74 of the shaft 64, which are respectively rotated by power devices in the form of the tubular shaft 62 and the shaft 64, both of which are also mounted on the front frame. I thus provide independently operable self-locking means carried on the front frame for operating each of the gang adjusting devices, since the levers 69, 72 are normally held against movement by the screw-threaded operating connections thereof, and can move only when the shafts with which they are respectively connected are rotated.

In so far as the structure of this application embodies patentable subject matter in common with that of my pending application Serial No. 354,194, filed January 26, 1920, it should be understood that claims for such common subject matter are not made herein as generic claims therefor are included in my said prior application. So far as the subject matter of this application is concerned, it is not limited to the specific construction shown and described, as obviously various changes or modifications may be made without departing from my invention as pointed out in the claims hereinafter made.

What I claim is—

1. The combination of two disk harrow units pivotally connected in tandem relation and including frames and adjustable disk gangs, devices carried by each harrow unit adapted to be operated to adjust the gangs thereof, independently operable power transmitting devices supported by one of said units and connected with said adjusting devices, respectively, and independently operable rotatable means unitarily mounted on one of said harrow units for alternatively operating either power transmitting device independently of the other.

2. The combination of two disk harrow units pivotally connected in tandem relation and including frames and adjustable disk gangs, devices carried by each harrow unit adapted to be operated to adjust the gangs thereof, independently operable power transmitting devices supported by one of said units and connected with said adjusting devices, respectively, and independently operable rotatable means unitarily mounted on the front harrow unit for alternatively operating either power transmitting device independently of the other.

3. The combination of two disk harrow units pivotally connected in tandem relation and including frames and adjustable disk gangs, devices carried by each harrow unit adapted to be operated to adjust the gangs thereof, independently operable power transmitting devices supported on the front unit and connected with said adjusting devices, respectively, and independently rotatable means unitarily mounted on the front harrow unit one within the other and operable alternatively to actuate either power transmitting device independently of the other.

4. The combination of two disk harrow units pivotally connected in tandem relation and including frames and adjustable disk gangs, devices carried by each harrow unit adapted to be operated to adjust the gangs thereof, independently operable screw actuated levers mounted on the front unit and connected with said adjusting devices, respectively, and dual means unitarily mounted on the front harrow unit to rotate about a common axis and independently rotatable to actuate either lever independently of the other.

5. The combination of two disk harrow units pivotally connected in tandem relation and including frames and adjustable disk gangs, devices carried by each harrow unit adapted to be operated to adjust the gangs thereof, a screw actuated lever mounted on the front unit and connected with the adjusting devices of the front gangs, a tubular shaft rotatably mounted in fixed position on the front frame and operable to actuate said lever, a screw actuated lever mounted on the front unit and operatively connected with the adjusting devices of the rear gangs, a shaft rotatable within the tubular shaft and operable to actuate the latter lever, and means manually operable to rotate said shafts independently to actuate the adjusting devices to which they are respectively connected.

6. The combination of two disk harrow units pivotally connected in tandem relation and including frames and adjustable disk gangs, devices carried by each harrow unit adapted to be operated to adjust the gangs thereof, a lever mounted on the front unit, and connected with the adjusting devices of the front gangs, a tubular shaft rotatably mounted in fixed position on the front frame and operable to actuate said lever, a lever mounted on the front unit and flexibly connected with the adjusting devices of the rear gangs, a shaft rotatable within the tubular shaft and operable to actuate the latter lever, and means manually operable to rotate said shafts independently to actuate the adjusting devices to which they are respectively connected.

7. In a disk harrow, a front frame, gangs of disks connected with said frame and adjustably movable fore and aft, a rear frame pivotally coupled with the front frame, gangs of disks connected with said rear frame and adjustably movable fore and aft, gang adjusting devices mounted on one of said frames and adapted to be operated independently of each other to adjust said front and rear gangs, respectively, and unitarily mounted independently operable means for operating said gang adjusting devices.

8. In a disk harrow, a front frame, gangs of disks connected with said frame and adjustably movable fore and aft, a rear frame pivotally coupled with the front frame, gangs of disks connected with said rear frame and adjustably movable fore and aft, gang adjusting devices mounted on one of said frames and adapted to be operated independently of each other to adjust said front and rear gangs, respectively, and independently operable co-axially mounted means for operating said gang adjusting devices.

9. In a disk harrow, a front frame, gangs of disks connected with said frame and adjustably movable fore and aft, a rear frame pivotally coupled with the front frame, gangs of disks connected with said rear frame and adjustably movable fore and aft, gang adjusting levers mounted on one of said frames and adapted to be operated independently of each other to adjust said front and rear gangs, respectively, devices carried by said front frame for operating the adjusting lever of the gangs connected with one of the frames, and independently operable means extending through the first mentioned operating means for operating the adjusting lever of the gangs of disks connected with the other frame.

10. In a disk harrow, a front frame, gangs of disks connected with said frame and adjustably movable fore and aft, a rear frame pivotally coupled with the front frame, gangs of disks connected with said rear frame and adjustably movable fore and aft, gang adjusting levers mounted on one of said frames and adapted to be operated independently of each other to adjust said front and rear gangs, respectively, means mounted on the front frame for operating the adjusting lever of the gangs connected with one of the frames, and means supported by said first mentioned operating means but operable independently thereof for operating the adjusting lever of the gangs connected with the other frame.

11. In a disk harrow, a front frame, gangs of disks connected with said frame, and adjustably movable fore and aft, a rear frame pivotally coupled with the front frame, gangs of disks connected with said rear frame and adjustably movable fore and aft, gang adjusting levers mounted on one of said frames and adapted to be operated independently of each other to adjust said front and rear gangs, respectively, and independently operable rotating means for operating each of said gang adjusting levers, said rotating means being supported to turn about the same axis.

12. In a disk harrow, a front frame, gangs of disks connected with said frame, and adjustably movable fore and aft, a rear frame pivotally coupled with the front frame, gangs of disks connected with said rear frame and adjustably movable fore and aft, gang adjusting levers mounted on the front frame and adapted to be operated independently of each other to adjust said front and rear gangs respectively, and independently operable self locking means carried on said front frame for operating each of said gang adjusting levers.

13. In a disk harrow, a front frame, gangs of disks movably connected with said frame, a rear frame pivotally coupled with the front frame, gangs of disks movably connected with said rear frame, separately operable, rotatable means mounted on the front frame, and devices supported by the front frame and actuated by said rotatable means respectively, for adjusting the sets of gangs one independently of the other.

14. In a disk harrow, a front frame, gangs of disks connected with said frame and adjustably movable forward and backward, devices carried by said frame for adjusting said gangs, a rear frame pivotally coupled with the front frame, gangs of disks connected with said rear frame and adjustably movable forward and backward, gang adjusting devices adapted to be operated to adjust said rear gangs, two independently operable screw actuated devices supported on the front frame and respectively associated with the two sets of gang adjusting devices, two threaded power transmitting devices respectively cooperating with the aforesaid screw actuated devices, and two power devices co-axially mounted on the front frame for rotating respectively the said threaded power transmitting devices.

15. In a disk harrow, a front frame, gangs of disks movably connected with said frame, a rear frame pivotally coupled with the front frame, gangs of disks movably connected with said rear frame, concentric power devices mounted on one of said frames and devices mounted on one of said frames and separately operable by said power devices respectively to adjust the sets of gangs independently of each other.

16. In a disk harrow, a front frame, gangs of disks movably connected with said frame, a rear frame pivotally coupled with the front frame, gangs of disks movably connected with said rear frame, rotatable power devices mounted on one of said frames and devices mounted on one of said frames and separably operable by said power devices respectively to adjust the sets of gangs independently of each other.

17. In a disk harrow, a front frame, gangs of disks movably connected with said frame, a rear frame pivotally coupled with the front frame, gangs of disks movably connected with said rear frame, rotatable power devices concentrically mounted on one of said frames and devices mounted on one of said frames and separably operable by said power devices respectively to adjust the sets of gangs independently of each other.

HERBERT B. McKAHIN.